United States Patent [19]

Lafleur et al.

[11] 4,150,952

[45] Apr. 24, 1979

[54] METHOD OF CONTROLLING THE AMOUNT OF SEED MATERIAL IN THE PRECIPITATION STAGE OF THE BAYER PROCESS

[75] Inventors: Alonzo D. Lafleur; John T. Creehan; Robert E. Baugh, all of Baton Rouge, La.

[73] Assignee: Ormet Corporation, Burnside, La.

[21] Appl. No.: 817,661

[22] Filed: Jul. 21, 1977

[51] Int. Cl.$^2$ .............................................. B01D 9/00
[52] U.S. Cl. ................................... 23/301; 73/432 PS; 423/119; 423/121; 423/DIG. 5; 422/245; 23/305 A
[58] Field of Search ............ 23/230 A, 253 A, 301 R, 23/273 R, 295, 305 A; 423/119, 121, DIG. 5; 73/432 PS

[56] References Cited

U.S. PATENT DOCUMENTS

| | | |
|---|---|---|
| 2,935,376 | 5/1960 | Roberts ............................... 23/301 R |
| 3,482,452 | 12/1969 | Tabikh ............................... 73/432 PS |
| 3,607,140 | 9/1971 | Miller et al. ........................... 423/121 |
| 3,797,319 | 3/1974 | Abe ................................... 73/432 PS |
| 3,838,480 | 10/1974 | Gnyra ................................... 423/119 |
| 4,049,773 | 4/1977 | Mejdell et al. ......................... 423/121 |

*Primary Examiner*—Herbert T. Carter
*Attorney, Agent, or Firm*—Bachman and LaPointe

[57] ABSTRACT

A method for sampling and controlling the addition of suspended gases, liquids and solids in a control stream to a process stream is disclosed wherein the surface area of the suspended material acts as the determining feature for control of the process. The measured surface area is compared with a preselected surface area to control the addition of the suspended material. This method is particularly useful for the control of particulate seed material to the process stream in the Bayer process for the production of alumina. The method is also broadly applicable to physical and/or chemical control means in an analytical scheme for controlling and monitoring any process.

5 Claims, 2 Drawing Figures

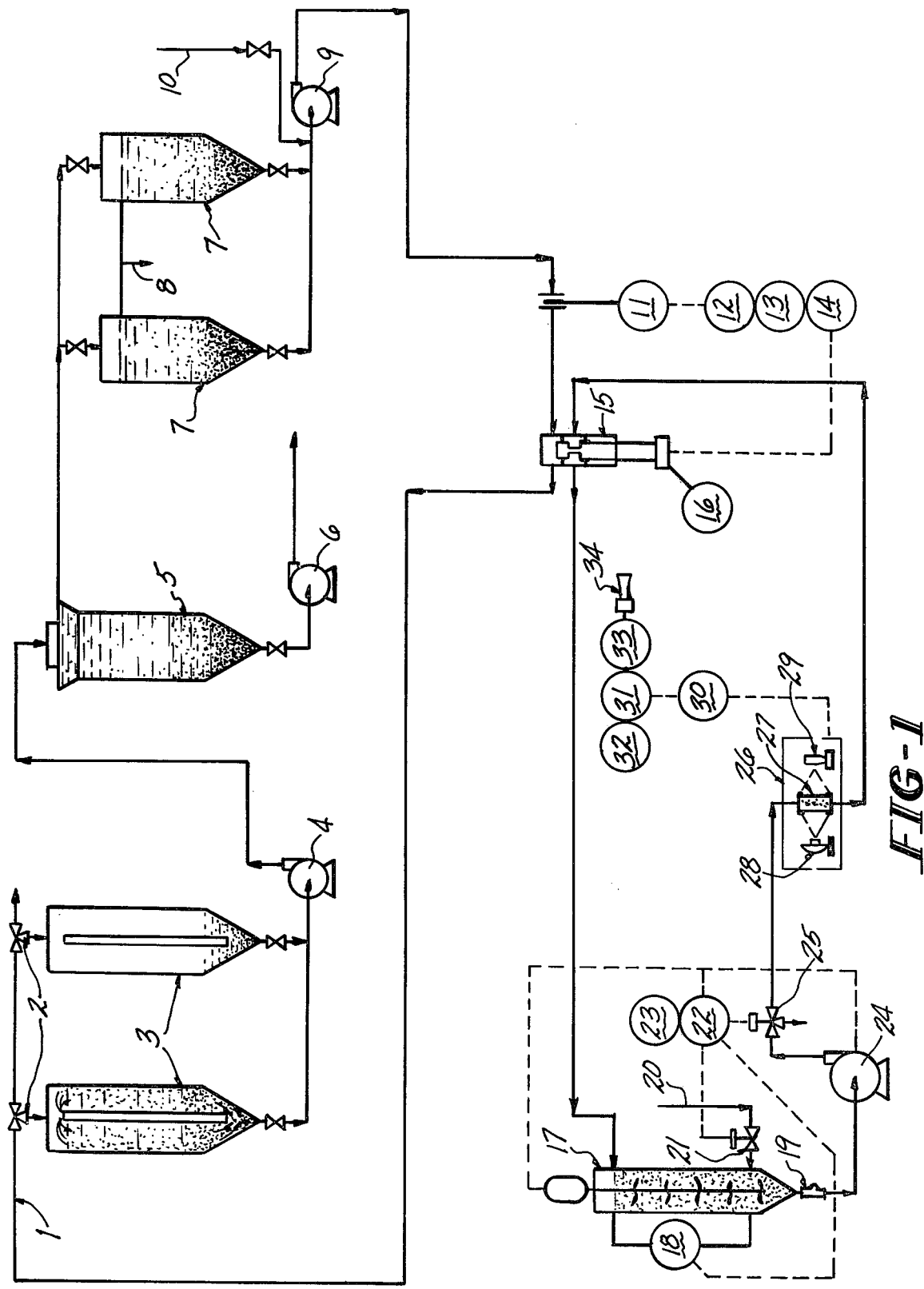

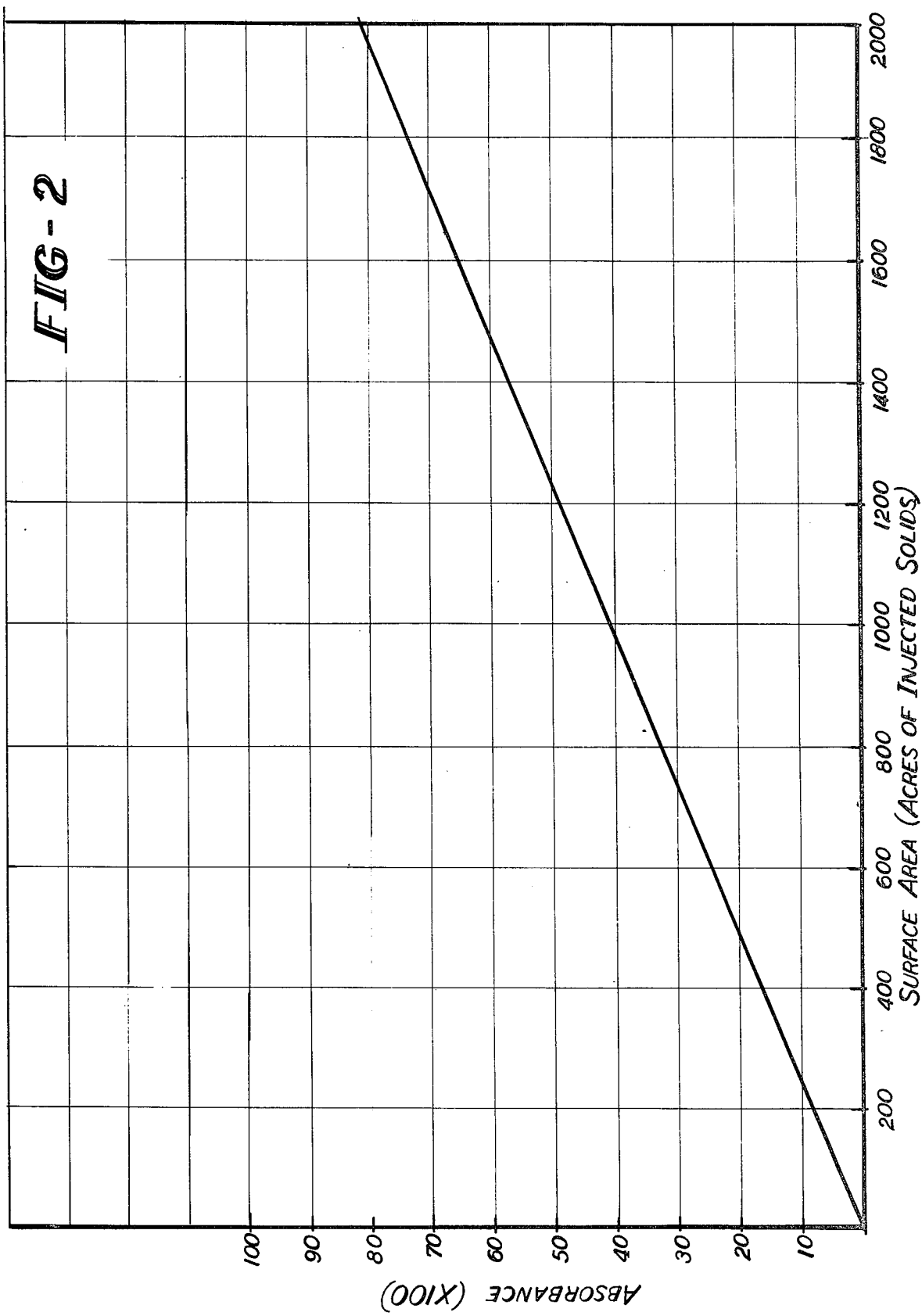

METHOD OF CONTROLLING THE AMOUNT OF SEED MATERIAL IN THE PRECIPITATION STAGE OF THE BAYER PROCESS

BACKGROUND OF THE INVENTION

The Bayer process for the production of alumina necessary for aluminum production depends upon both the yield and particle size of alumina produced in the process. The process is also dependent upon the bauxite digestion, clarification for the removal of the production residue, the extraction of hydrate alumina from this clarified liquor using a precipitation process, separation of the finer hydrate precipitation solids for eventual seeding operations and finally washing and drying of the coarser solids obtained from the precipitation process for eventual calcination into the final anhydrous alumina.

Production of alumina from this process is greatly increased if the precipitation operation is optimized. This precipitation is induced by the injection of seed material which is generally alumina trihydrate particles. Dissolved alumina in the clarified process stream precipitates by crystallization upon the surfaces of the injected seed material. Therefore, control of the amount of injected seed material added at this precipitation step is very critical to the entire operation. Injection of too much seed into the precipitation step will cause insufficient crystal growth upon the seed and will reduce the amount of product having a quality size. Injection of too little seed material will also reduce the amount of product and will reduce the particle quality of any alumina precipitated out in the process. In determining the optimum amount of seed material to be injected into the precipitation step of the Bayer process, the total surface area of the seed material should be accurately measured since the precipitation takes place most efficiently on the seed material's available surface area.

Previous methods of controlling the amount of seed material added in the Bayer process have generally been based upon controlling the amount of seed material added to a given volume of process liquid. This amount has been measured by determining the amount of seed material removed from storage tanks, by using level measurement or by calculating the volume injected using a flow meter or a mass flow meter. The problem with these methods is that the surface area of the injected seed material may have changed during the process, requiring adjustments in the amount of seed material injected.

Other methods of determining the surface area of seed material have been contemplated, particularly in "The Chemical Background of the Aluminum Industry", by T. G. Pearson, The Royal Institute of Chemistry, 1955, Page 30. This particular reference mentions that such techniques as air permeability, light extinction or gas absorption may be utilized for determining the surface area of injected seed material. There is no detailed discussion in this reference as to how these techniques may be utilized.

Therefore, it is a primary object of the present invention to provide a method for determining the surface area of injected seed material in the Bayer process for the production of alumina.

It is another object of the present invention to provide a method as above which provides control and accuracy on a continuous basis.

It is a further object of the present invention to provide a method as above which directly controls the amount of injected seed material in the Bayer process based upon the amount of desired surface area of the seed material.

Further objects and advantages of the present invention will become apparent from a consideration of the following description.

SUMMARY OF THE INVENTION

The present invention provides means for accomplishing these objects and advantages by automatically sampling a definite volume of seed material at each incremental volume of injection flow to the precipitation process. The particular measuring step of the instant invention utilizes a light measuring device to determine the total surface area of seed material injected at a particular time into the precipitation process. Once the measured surface area of the injected seed material reaches a preset value, control mechanisms either indicate this fact to a manual controller or act to automatically shut off and/or divert the amount of injected seed material. This particular method, by utilizing measurements throughout the flow during the precipitation step, reduces wide variations and sampling error in the measurement process.

BRIEF DESCRIPTION OF THE DRAWINGS

FIG. 1 is a diagrammatic flow sheet illustrating the steps of the present invention.

FIG. 2 is a graph showing the relationship between absorbance and surface area of the injected seed material utilized in the method of the present invention.

DETAILED DESCRIPTION

The present invention provides a means for accurately and effectively measuring and controlling the amount of fine seed particles injected into the Bayer process for the production of alumina. These fine seed particles are generally particles of alumina trihydrate upon which the dissolved alumina in the Bayer process stream precipitates by crystallization upon the surfaces of the injected seed material. The measuring and controlling apparatus utilized in the present invention may best be stated by consulting FIG. 1.

FIG. 1 is a diagrammatic flow sheet illustrating both the production and controlling steps involved in the present invention. In FIG. 1, process stream 1 flows through valves 2 to precipitation tanks 3. These precipitation tanks are where the dissolved alumina in the process stream precipitates upon the injected seed particles of alumina trihydrate. The combination of precipitated particles and process liquid is pumped by slurry pump 4 into tank 5 which acts as a product (precipitated alumina particles) and fine solids (seed particles) separator. The product is drawn off for eventual processing through slurry pump 6 while the fine solids, which are to become the seed particles injected back into the process stream, are drawn off to clarification tanks 7. The clarified process liquid 8 is drawn off and returned to process stream 1 after enrichment with product precursor. The fine particles are drawn off into the solids injection pump 9, from which they are to be injected back into the process stream 1. Injection liquid 10 is added to the fine particle stream before the solids injection pump. This entire portion of the process stream is concerned with the eventual production of alumina particles. The measuring and controlling portion of the process, with which this invention is concerned, is shown as the bottom closed cycle of FIG. 1.

This cycle starts with a recording device inserted into the process stream which is controlled by the flow recorder controller transmitter 11 which is in turn connected to the flow integrator recorder controller 12, proportional flow timer 13 and sampler insertion timer 14. A portion of the fine particle seeding stream is drawn off by sampler 15 which is controlled by an incremental flow controlled sampling valve 16. The portion of the fine particle stream drawn off by sampler 15 then flows to the dilution and mixing tank 17 which is controlled by a level mixing controller transmitter 18. This transmitter is connected to level mixing controller 22 and level mixing controller switch 23. Additional liquid is added through line 20 which is controlled by the level mixing controller 22 through a control valve 21. Mixed and diluted fine particle stream is then directed through strainer 19 into analyzer pump 24. A portion of the stream may be diverted outside of the system through control valve 25 which is also controlled by the level mixing controller 22. The fine particle stream which is to be measured is then directed to photometer 26 which consists of a sample cell placed in the fine particle stream through which light from a light source 28 is directed onto a light receiving device 29 which is connected to several recording devices. These recording devices include a surface area recorder transmitter 30, a surface area recorder 31, a surface area recorder switch 32 and a surface area analyzer 33. A variable acreage alarm 34 is attached to the surface area analyzer 33 and is activated when the actual acreage of fine particle seed material starts to exceed the desired acreage set into the variable alarm 34. The fine particle stream is then directed from the photometer 26 through the control valve 25 back into the process stream 1.

Although a variable acreage alarm is shown in FIG. 1, it is not necessary that this alarm is utilized in conjunction with manual control of the fine particle stream. This alarm and its corresponding surface area analyzer may be connected to a further control valve in the fine particle stream to automatically control the amount of fine particles added to the process stream. The analyzer and recorder arrangement may also be connected directly to a process stream diverter valve on each of the precipitation tanks to control the amount of process stream added to each of the tanks. There may also be other variations in the particular pieces of process apparatus controlled by the surface area analyzer. This analyzer may be connected to the solids injection pump or to the exit valves on the fine particle storage tanks to directly control the fine particle stream at its source. Once the surface area controller, in conjunction with the surface area analyzer, has sensed a preselected acreage for the fine particles, the alarm could signal actions in the process in the reverse order of normal flow. That is, this alarm could drain the dilution and mixing tank and thus divert the process stream to another precipitation tank for starting the process all over again. Any combination of manual and automatic modes may be selected for the controller operation of the process by any degree of manual activation of the incremental flow sampling valve 16 shown in FIG. 1. The volumetric capacities of the precipitation tanks, the dilution and mixing tank, the sampler and the photometer may all be varied in various combinations to proportionately sample any process or product stream of any quantity. The surface area controller is also suitable for representative sampling of gases, liquids or solids. Suspensions ranging up to 100% concentration may be sampled without changing the particle size characteristics. In such a case, the photometer would then be bypassed and the drain from the dilution and mixing tank would be replaced by a container. The surface area controller is suitable for various analyses of gases, liquids or solids suspensions. In these cases, in addition to retention of the characteristics of representative sampling, the photometer may be replaced by any combination of analytical instrumentation and the dilution tank may be modified for the addition of reagents which would produce a measurable reaction for process monitoring or control purposes. It should be noted that the mixing device in the dilution and mixing tank may be any source of agitation. This agitation is necessary for quick mixing and homogeneous suspension without attrition of solids when they are present within the tank. The agitation should not be such as to affect the original characteristics of the sampled stream. Similarly, the analyzer pump and the other pumps utilized in the process may be of any particular mode of liquid transfer provided they do not interfere or change the particle size of the solids within the process stream.

The flow recorder controller transmitter utilized in the sampling procedure may be any flow indication or transmitting device which is capable of transmitting a signal between approximately 0 and 1500 gpm. Other ranges may be suitable when changes are made in the proportional flow timer and other volumetric portions of the controller. The flow integrator recorder controller may be any device which transforms a variable flow signal into a recordable form such as an electrical or pneumatic pulse with an amplitude duration of frequency proportional to the sensed flow. The proportional flow timer, which controls the sampling device utilized in the present invention, may be varied from 1 second to 100 seconds for sampling rates of 1 sample for every 26.2 to 2620 gallons of flow. The optimal sampling rate is set for one sample in every 572 gallons of flow. Selection of a larger or smaller timer setting will allow proportional sampling rates. The sampler must be precisely volumetric. The optimal sampling size taken from the process stream by the sampler should be 3.1 ml. Larger or smaller samples may be taken according to requirements of sampling and analysis. Any commercially available sampling valve which removes a precise volume of sample from a stream may be utilized with the present invention.

The sampling and control device utilized in the present invention automatically samples each seed injection stream periodically at small increments of flow throughout the total period of flow of the stream. Any variation in the percentage solids in the stream and the corresponding increase or decrease in surface area of the solids is thus reflected in the incremental samples. Since the total surface area of the injected seed material is actually measured in the present invention, any time delays inherent with other measuring methods, such as sampling, compositing of shift samples, analysis for surface area and averaging of surface area analysis for subsequent shifts are thus eliminated. The invention also controls each injection of particulate seed material so that the amount of seed introduced to each precipitation tank is a function only of its total surface area. The control is, therefore, instantaneous and representative of each seed injection rather than being based upon previous and averaged surface area analyses. Surface area of the seed material is a direct precipitation parameter which is directly measured and controlled by the present invention, thus removing disadvantages previously inherent in indirect and approximate control. By controlling each seed injection with its actual measured surface area, precipitation of alumina trihydrate is more uniform than with the approximation of mass flow instrumentation. The product uniformity resulting from such actual surface area measurement results in a net increase in productivity throughout the process from improved control of the process. Historical control of such a process based upon a fixed amount of material favors variation by varying injections of seed material into the precipitating tanks depending upon the proportionality of past surface area analysis to actual surface area analysis.

The invention may more readily be understood from a consideration of the following illustrative example.

EXAMPLE

This example specifically sets forth the control process for seed introduction into the batch precipitation step of the Bayer process for alumina. This particular example does not preclude the application of this invention to a continuous precipitation process.

The particular pieces of apparatus illustrated in FIG. 1 were set up to produce alumina. An operator directed the process stream through the valves at 2500 gallons per minute (gpm) into precipitation tanks, each with a 300,000 gallon capacity. The operator then switched on the surface area analyzer and set the alarm at a desired acreage of 1500 acres. This was done after checking the graph illustrated in FIG. 2 for the relationship between surface area absorbance in the photometer and the surface area in acres of the injected particles. The operator then switched on the level mixing controller switch to activate the level mixing controller and the level mixing controller transmitter connected to the dilution and mixing tank. The dilution tank filled to a preselected volume of 5 gallons with a compatible dilution liquid of process stream condensate. A 1725 rpm mixer and peristaltic pump started automatically when the dilution and mixing tank was filled to its prescribed level. The dilution liquid was mixed and circulated at a rate of 0.76 gpm from the bottom of the tank through a 20 mesh Tyler screen (strainer 19) to the transparent sample cell of a single beam photometer, through the sample releasing cavity of the sampler and returned to the tank. At this point, the surface area recorder indicated a zero acre reading transmitted through the surface area recorder transmitter from the photometer.

The operator started the seed injection pump (having a 1500 gpm capacity) and opened the injection liquid valve, thus allowing the settled solids to flow freely at a rate of 850 gpm from the fine solids storage tanks. The flow recorder controller transmitter on the seed injection pipe sensed the flow, converted this flow to cumulative gallons pumped by utilizing the flow integrator recorder controller and simultaneously started the proportional flow timer. This proportional flow timer was preset at 22.88 seconds for a sampling rate of one sample for each 572 gallons of seed injection liquid. It should be noted here that a seed injection flow rate of 1500 gpm would cause sampling to take place every 22.88 seconds of real time while a 750 gpm flow rate would cause sampling to take place every 45.76 seconds. The proportional flow timer signaled the sampler insertion timer to insert the piston of the sampler for 2 seconds into the liquid stream and retract an exact volume of 3.1 ml. of seed injection liquid.

The 3.1 ml. sample was directed from the cavity within the sampler to the dilution and mixing tank and a portion of the stored seed suspension within the tank was continuously pumped through the photometer to the sampler where further incremental flow samples were introduced back to the dilution and mixing tank for further storage and cumulative analysis. The photometer sensed the amount of surface area accumulating in the dilution and mixing tank and caused, through the surface area recorder transmitter, a recording to be made on the surface area recorder until the alarm was tripped at the preset acreage of 1500 acres. This alarm signaled the operator to shut off the injection liquid valve and the solids injection pump. The level mixing controller switch was set by the operator to open the control valve and drain the sampling line for a further batch precipitation process. When the line was empty, the acreage controller was reset for another batch operation.

A batch process as described above was utilized for various shifts and the amount of control utilizing the surface area controller of the present invention was compared to the amount of control achieved with a mass flow meter of the prior art. The results are shown in Table I and the acres described therein are for a particle size of −325 mesh.

TABLE I

| | SURFACE AREA CONTROLLER VS. MASS FLOW METER CONTROL OF SOLIDS INJECTION | | | | | | | |
|---|---|---|---|---|---|---|---|---|
| Shift | Proper Tonnage | Historical Target Tonnage | Historical Resultant Acres | Target Acres | Percentage Deviation | Surface Area Controller Acres | Target Acres | Percentage Deviation |
| 1 | 78 | 89 | 1425 | 1250 | +14 | 1234 | 1250 | −1.3 |
| 2 | 68 | 78 | 1418 | 1250 | +13 | 1295 | 1250 | +3.6 |
| 3 | 77 | 80 | 1302 | 1250 | +4.2 | 1236 | 1250 | −1.1 |
| 4 | 82 | 70 | 1070 | 1250 | −14 | 1223 | 1250 | −2.2 |
| 5 | 76 | 68 | 1123 | 1250 | −10 | 1255 | 1250 | +0.4 |
| 6 | 70 | 79 | 1422 | 1250 | +14 | 1296 | 1250 | +3.6 |
| 7 | 79 | 74 | 1167 | 1250 | −6.6 | 1230 | 1250 | −1.6 |
| 8 | 76 | 73 | 1206 | 1250 | +3.6 | 1288 | 1250 | +3.1 |
| 9 | 80 | 68 | 1056 | 1250 | −16 | 1242 | 1250 | −0.6 |
| 10 | 80 | 70 | 1086 | 1250 | −13 | 1242 | 1250 | −0.6 |
| 11 | 74 | 74 | 1259 | 1250 | +0.7 | 1242 | 1250 | −0.6 |

It can be seen from the results shown in Table I that the surface area controller of the present invention resulted in a lower percentage deviation of measurement for any of the shifts than measurement and control utilizing a mass flow meter. It should be noted that each percentage of deviation, when taken with a large amount of product being produced in each shift, represents a huge volume of product in savings.

Although the present invention is a major advancement in the control of the precipitation step of the Bayer process for the production of alumina, it should be noted that the present invention may be utilized to control any process that incorporates injected solid material to induce precipitation. The present invention is not limited to the precipitation process and may be utilized in sampling and analysis of products or product production streams after substitution or modification of the photometer and flow sensing devices utilized in the present invention. For example, the photometer may be replaced by an analytic counting device or any suitable measuring device for particle sizing and surface area measurement. The flow sensing device, dilution and mixing tank and photometer may be separately or in combination adjusted for manual or completely automated process control or any mixture of both. The present invention may be utilized for batch processes or continuous processes or any combination thereof.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a method for sampling and controlling the amount of particulate seed material added to the process stream in the precipitation stage of the Bayer process for the production of alumina, the improvement which comprises:
    (a) withdrawing a proportional sample of preset volume increments from the process stream utilized to precipitate the aluminum precursor in the process in a control stream;
    (b) collecting said proportional sample in a dilution unit to which additional process stream liquid has been added;
    (c) withdrawing a portion of the material from said dilution unit and passing said portion through a measuring device for particle sizing and total surface area measurement in order to determine the surface area of the suspended material therein; and
    (d) comparing said surface area with a standard which represents a preselected surface area for suspended material and using results of said comparison to control the amount of particulate seed material added to the process stream.

2. In an apparatus for sampling and controlling the amount of particulate seed material added to the process stream at the precipitation stage of the Bayer process for the production of alumina, the improvement comprising:
    (a) means for withdrawing a proportional sample of preset volume increments from the process stream utilized to precipitate the aluminum precursor in the process in a control stream;
    (b) collection means and dilution means to store and dilute said proportional sample to which additional process stream liquid is added;
    (c) measuring means to determine the total surface area of the suspended material within said samples in said collection means;
    (d) comparison means to compare said measured surface area from said measuring means with a standard which represents a preselected surface area for suspended material; and
    (e) control means to control the return of the control stream to the process stream.

3. An apparatus according to claim 2 wherein said control means controls the flow of the control stream back into the process stream.

4. An apparatus according to claim 2 wherein said control means controls the amount of particulate seed material withdrawn from the precipitation units within the process.

5. An apparatus according to claim 2 wherein drain means are connected to said collection unit and controlled by the level of suspended material within the collection unit in combination with said measuring means.

* * * * *